United States Patent
Lin et al.

(10) Patent No.: US 9,859,997 B1
(45) Date of Patent: Jan. 2, 2018

(54) RECEIVING CIRCUIT CAPABLE OF PERFORMING I/Q MISMATCH CALIBRATION BASED ON EXTERNAL OSCILLATING SIGNAL

(71) Applicant: Realtek Semiconductor Corporation, Hsinchu (TW)

(72) Inventors: Ying-Hsi Lin, Hsinchu (TW); Ming-Chung Huang, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/385,230

(22) Filed: Dec. 20, 2016

(30) Foreign Application Priority Data

Jun. 28, 2016 (TW) .............................. 105120305 A

(51) Int. Cl.
H04L 27/00 (2006.01)
H04B 17/21 (2015.01)
H04B 1/12 (2006.01)

(52) U.S. Cl.
CPC ............ *H04B 17/21* (2015.01); *H04B 1/126* (2013.01); *H04L 27/0014* (2013.01); *H04L 2027/0016* (2013.01)

(58) Field of Classification Search
CPC ..... H04B 17/0085; H04B 17/21; H04B 17/14
USPC ........................................................ 375/346
See application file for complete search history.

(56) References Cited

U.S. PATENT DOCUMENTS

| | | | | |
|---|---|---|---|---|
| 7,120,413 | B2 * | 10/2006 | Lee ........................ | H03D 7/165 348/731 |
| 7,262,815 | B2 * | 8/2007 | Su .......................... | H03D 7/165 348/731 |
| 8,010,064 | B2 | 8/2011 | Kim et al. | |
| 8,446,995 | B2 | 5/2013 | Zeng | |
| 8,611,472 | B2 * | 12/2013 | Mishra ................ | H04L 27/0014 375/260 |
| 8,744,385 | B2 | 6/2014 | Yahav et al. | |
| 9,025,645 | B2 | 5/2015 | Al-Qaq et al. | |
| 2005/0152481 | A1 * | 7/2005 | Lin ........................ | H03D 3/009 375/346 |

(Continued)

OTHER PUBLICATIONS

Taiwanese Office Action and Search Report, dated Aug. 31, 2017, for Taiwanese Application No. 105120305, with a partial English translation of the Taiwanese Office Action and an English translation of the Taiwanese Search Report.

*Primary Examiner* — Daniel Washburn
*Assistant Examiner* — Berhanu Tadese
(74) *Attorney, Agent, or Firm* — Birch, Stewart, Kolasch & Birch, LLP

(57) ABSTRACT

A receiving circuit includes: a first receiving terminal for receiving a RF signal; a second receiving terminal for receiving an external oscillating signal generated by an external oscillator; a low-noise amplifier coupled with the first receiving terminal and the second receiving terminal and utilized for generating an output signal; a first switch element positioned between the second receiving terminal and the low-noise amplifier; an in-phase signal processing circuit for generating an in-phase detection signal based on the output signal; an quadrature signal processing circuit for generating an quadrature detection signal based on the output signal; and a calibration circuit for controlling the first switch element and capable of performing an I/Q mismatch calibration operation according to the in-phase detection signal and the quadrature detection signal when the first switch element is turned on.

10 Claims, 5 Drawing Sheets

(56) References Cited

U.S. PATENT DOCUMENTS

| | | | |
|---|---|---|---|
| 2007/0099570 A1* | 5/2007 | Gao | H04B 1/30 455/63.1 |
| 2008/0075199 A1 | 3/2008 | Bengtson | |
| 2009/0154595 A1* | 6/2009 | Choksi | H03D 3/009 375/295 |
| 2010/0027689 A1* | 2/2010 | Kohlmann | H04L 27/368 375/260 |
| 2012/0039375 A1 | 2/2012 | Eitel | |
| 2012/0281787 A1* | 11/2012 | Wang | H04L 27/3863 375/316 |
| 2012/0300818 A1* | 11/2012 | Metreaud | H04B 1/30 375/219 |
| 2013/0114238 A1* | 5/2013 | Cho | H01L 51/504 362/1 |
| 2013/0114453 A1* | 5/2013 | Hung | H04L 27/2675 370/252 |
| 2013/0230131 A1* | 9/2013 | Moore | H04B 1/0032 375/350 |
| 2013/0272175 A1* | 10/2013 | Zargari | H04L 5/14 370/281 |
| 2014/0093018 A1* | 4/2014 | Wei | H04L 7/042 375/343 |
| 2014/0341263 A1* | 11/2014 | Wu | H04B 17/0085 375/224 |
| 2015/0118970 A1* | 4/2015 | Thoukydides | H04B 17/14 455/67.14 |
| 2015/0215150 A1* | 7/2015 | Chen | H04L 27/364 375/297 |
| 2016/0359614 A1* | 12/2016 | Hao | H04L 7/033 |

* cited by examiner

US 9,859,997 B1

RECEIVING CIRCUIT CAPABLE OF PERFORMING I/Q MISMATCH CALIBRATION BASED ON EXTERNAL OSCILLATING SIGNAL

CROSS-REFERENCE TO RELATED APPLICATIONS

This application claims the benefit of priority to Patent Application No. 105120305, filed in Taiwan on Jun. 28, 2016; the entirety of which is incorporated herein by reference for all purposes.

BACKGROUND

The disclosure generally relates to a receiving circuit and, more particularly, to a receiving circuit capable of performing I/Q mismatch calibration based on an external oscillating signal.

In the receiving circuit of many wireless communication devices, the in-phase signal (a.k.a. I signal) and the quadrature signal (a.k.a. Q signal) typically have so-called I/Q mismatch phenomenon, which means that there is a gain mismatch and/or a phase mismatch between the in-phase signal and the quadrature signal.

The I/Q mismatch phenomenon often results in mirror frequency interference which would reduce the signal-to-noise ratio (SNR) of the receiving circuit, thereby degrading the throughput of the overall system.

SUMMARY

An example embodiment of a receiving circuit for processing a radio frequency signal transmitted from an external antenna and capable of performing an I/Q mismatch calibration based on an external oscillating signal generated by an external oscillator is disclosed. The receiving circuit comprises: a first receiving terminal utilized for coupling with the external antenna to receive the radio frequency signal; a second receiving terminal utilized for coupling with an output terminal of the external oscillator to receive the external oscillating signal; a low-noise amplifier, coupled with the first receiving terminal and the second receiving terminal, arranged to operably generate an output signal based on an incoming signal; a first switch element positioned on a signal path between the second receiving terminal and the low-noise amplifier; an in-phase signal processing circuit, coupled with an output terminal of the low-noise amplifier, arranged to operably generate an in-phase detection signal based on the output signal; a quadrature signal processing circuit, coupled with the output terminal of the low-noise amplifier, arranged to operably generate a quadrature detection signal based on the output signal; and a calibration circuit, coupled with the first switch element, the in-phase signal processing circuit, and the quadrature signal processing circuit, arranged to operably control the first switch element and capable of performing the I/Q mismatch calibration according to the in-phase detection signal and the quadrature detection signal when the first switch element is turned on.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
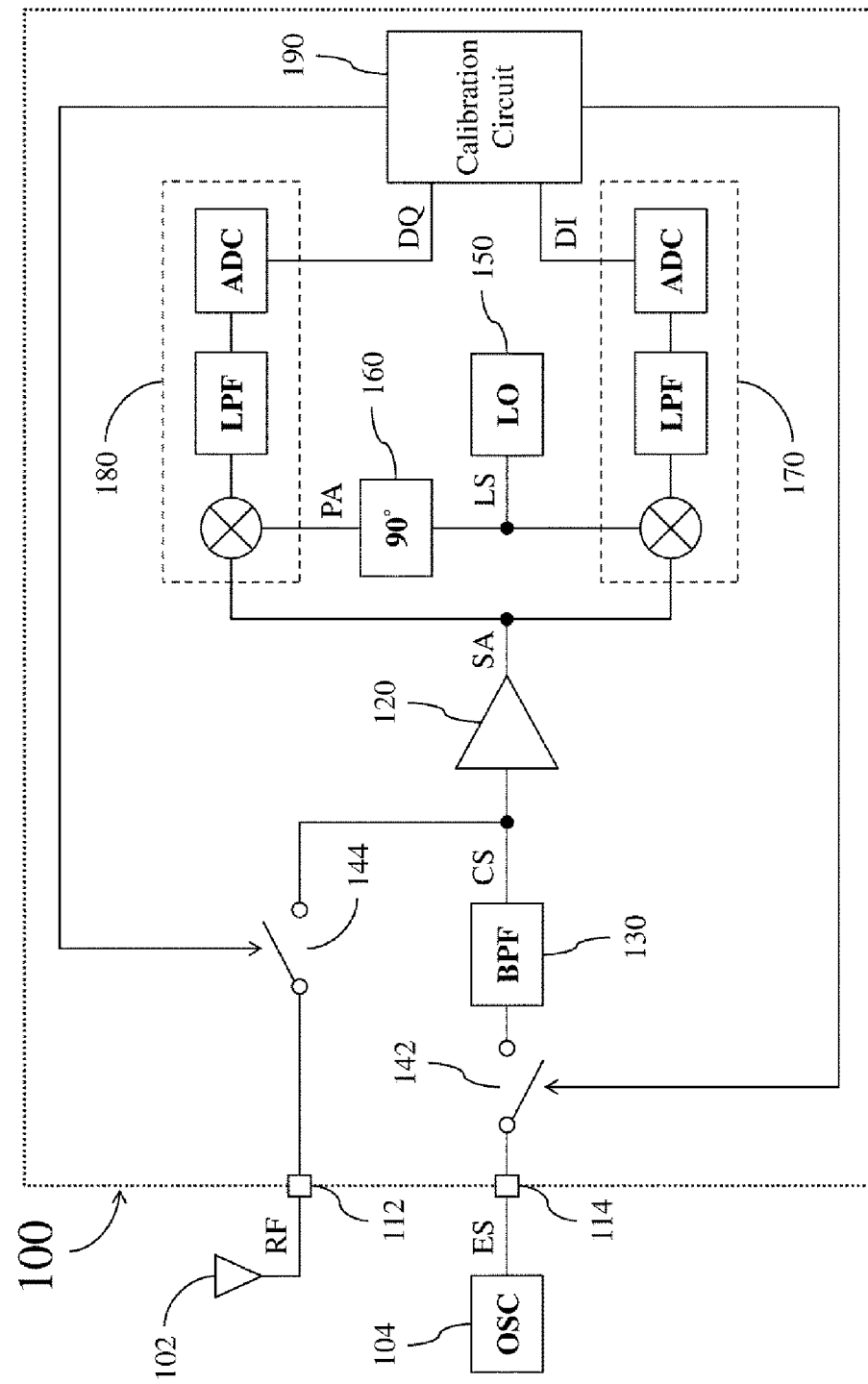
FIG. 1 shows a simplified functional block diagram of a receiving circuit according to a first embodiment of the present disclosure.

FIG. 1 shows a simplified functional block diagram of a receiving circuit 100 according to one embodiment of the present disclosure. The receiving circuit 100 is utilized for processing a radio frequency signal RF transmitted from an external antenna 102 and capable of performing an I/Q mismatch calibration according to an external oscillating signal ES generated by an external oscillator 104. The external oscillator 104 may be realized with various existing oscillators employed in a communication system to which the receiving circuit 100 resides.

In the embodiment of FIG. 1, the receiving circuit 100 comprises a first receiving terminal 112, a second receiving terminal 114, a low-noise amplifier 120, a band-pass filter 130, a first switch element 142, a second switch element 144, a local oscillator 150, a phase adjusting circuit 160, an in-phase signal processing circuit 170, a quadrature signal processing circuit 180, and a calibration circuit 190.

The first receiving terminal 112 is utilized for coupling with the external antenna 102 to receive the radio frequency signal RF. The second receiving terminal 114 is utilized for coupling with the output terminal of the external oscillator 104 to receive the external oscillating signal ES.

The input terminal of the low-noise amplifier 120 is coupled with the first receiving terminal 112 and the second receiving terminal 114 to generate an output signal SA having less noise according to a received incoming signal.

The band-pass filter 130 is positioned on a signal path between the second receiving terminal 114 and the low-noise amplifier 120, and arranged to operably generate a calibration signal CS according to the external oscillating signal ES. For example, in some embodiments where the ideal center frequency of the radio frequency signal RF is equal to or near the frequency of the Nth harmonic signal of the external oscillating signal ES, the band-pass filter 130 may output the Nth harmonic signal of the external oscillating signal ES to be the calibration signal CS.

The first switch element 142 is positioned on the signal path between the second receiving terminal 114 and the low-noise amplifier 120, and arranged to operate under control of the calibration circuit 190. For example, the first switch element 142 may be positioned on the signal path between the second receiving terminal 114 and the band-pass filter 130, as shown in FIG. 1.

The second switch element 144 is positioned on the signal path between the first receiving terminal 112 and the low-noise amplifier 120, and arranged to operate under control of the calibration circuit 190.

The local oscillator 150 is coupled with the in-phase signal processing circuit 170, and arranged to operably generate and output a local oscillating signal LS to the in-phase signal processing circuit 170.

The phase adjusting circuit 160 is coupled with the local oscillator 150 and the quadrature signal processing circuit 180. The phase adjusting circuit 160 is arranged to operably generate a phase-adjusted signal PA having a predetermined phase difference (e.g., 90 degrees) with the local oscillating signal LS, and to operably output the phase-adjusted signal PA to the quadrature signal processing circuit 180, In practice, the phase adjusting circuit 160 may be realized with various existing circuits capable of adjusting the signal phase, such as a delay circuit, a buffer circuit, a phase-locked loop, and the like.

The in-phase signal processing circuit 170 is coupled with the output terminal of the low-noise amplifier 120, and arranged to operably generate an in-phase detection signal DI according to the output signal SA generated by the low-noise amplifier 120 and the local oscillating signal LS.

The quadrature signal processing circuit 180 is coupled with the output terminal of the low-noise amplifier 120, and has substantially the same circuit structure of the in-phase signal processing circuit 170. The quadrature signal processing circuit 180 is arranged to operably generate a quadrature detection signal DQ according to the output signal SA generated by the low-noise amplifier 120 and the phase-adjusted signal PA.

In the embodiment of FIG. 1, the calibration circuit 190 is coupled with the first switch element 142, the second switch element 144, the in-phase signal processing circuit 170, and the quadrature signal processing circuit 180. The calibration circuit 190 is arranged to operably control the operations of the first switch element 142 and the second switch element 144. For example, the calibration circuit 190 may turn off the second switch element 144 while turns on the first switch element 142, and may turn off the first switch element 142 while turn on the second switch element 144.

When the receiving circuit 100 needs to perform the I/Q mismatch calibration, the calibration circuit 190 may turn on the first switch element 142 and turn off the second switch element 144. In this situation, the signal received by the input terminal of the low-noise amplifier 120 is the calibration signal CS generated by the band-pass filter 130 based on the external oscillating signal ES, rather than the radio frequency signal RF transmitted from the external antenna 102.

At this moment, the output signal SA, the in-phase detection signal DI, and the quadrature detection signal DQ are corresponding to the calibration signal CS generated by the band-pass filter 130. Accordingly, the calibration circuit 190 may perform an I/Q mismatch calibration according to the in-phase detection signal DI and the quadrature detection signal DQ. For example, the calibration circuit 190 may calculate the power of the image frequency component caused by the I/Q mismatch according to the in-phase detection signal DI and the quadrature detection signal DQ, and then adjust related compensation coefficients in the calibration circuit 190 and/or the gain of the low-noise amplifier 120 by adopting various existing calibration algorithms, so as to minimize the power of the image frequency component.

The I/Q mismatch calibration will be completed when the calibration circuit 190 reduces the power of the image frequency component to a minimum level. In this situation, the resulting compensation coefficients and/or the gain of the low-noise amplifier 120 may be recorded on an appropriate storage circuit (not shown) for use in the subsequent operations.

Then, the receiving circuit 100 may conduct normal signal receiving operations. In this situation, the calibration circuit 190 may turn on the second switch element 144 and turn off the first switch element 142, so that the signal received by the input terminal of the low-noise amplifier 120 is witched to the radio frequency signal RF transmitted from the external antenna 102, rather than the calibration signal CS.

In practice, the calibration circuit 190 may be realized with various digital processing circuits having computing ability.

Additionally, different functional blocks of the receiving circuit 100 may be integrated into a single receiver IC. In this situation, the aforementioned external antenna 102 and external oscillator 104 may be arranged on a circuit board coupling with the receiver IC.

The disclosed receiving circuit 100 may be utilized in many applications, such as the wireless communication devices adopting WiMAX, GSM, UMTS, HSPA, LTE, LTE-Advanced, other 3GPP series radio accessing technologies, IEEE 802.11 series communication protocols, or Bluetooth communication protocols. In addition, the disclosed receiving circuit 100 may be utilized in the GPS (Global Positioning System) receivers, the BDS (BeiDou Navigation Satellite System) receivers, the AGPS (Assisted GPS) receivers, the indoor GPS receivers, and the like.

Figure 2:
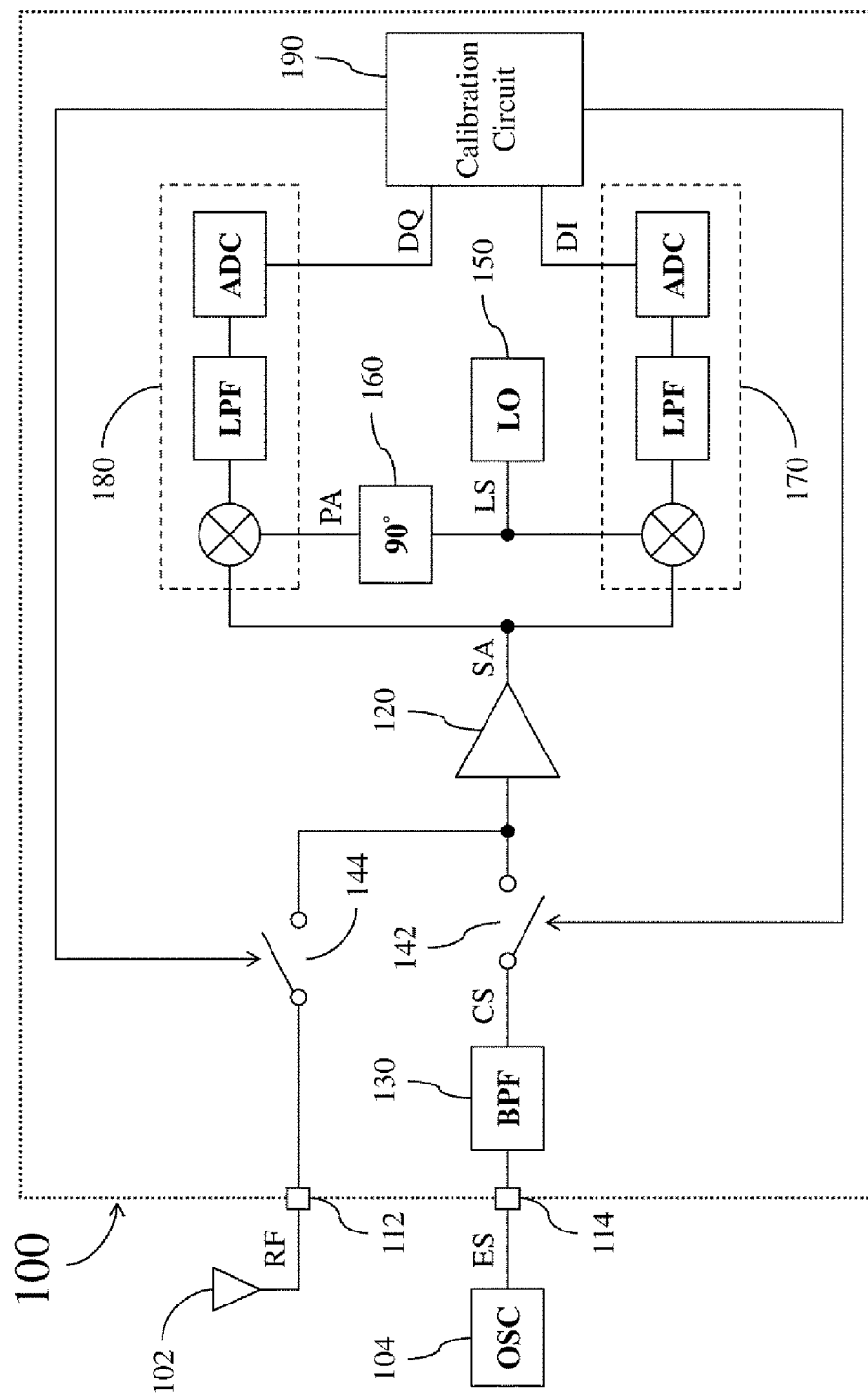
FIG. 2 shows a simplified functional block diagram of a receiving circuit according to a second embodiment of the present disclosure.

In practice, the first switch element 142 in the receiving circuit 100 may be instead positioned on the signal path between the band-pass filter 130 and the low-noise amplifier 120, as shown in FIG. 2.

Figure 3:
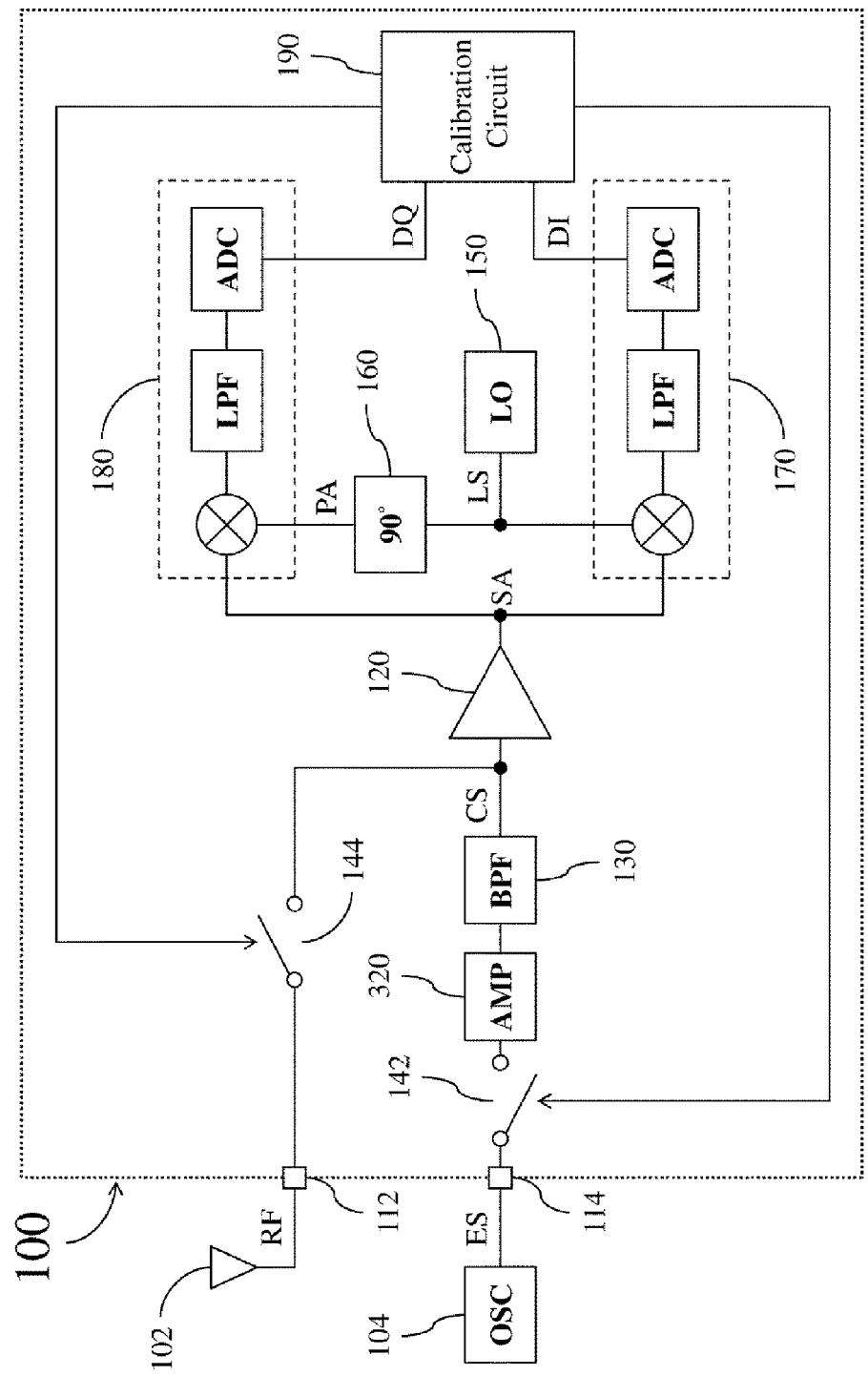
FIG. 3 shows a simplified functional block diagram of a receiving circuit according to a third embodiment of the present disclosure.

FIG. 3 shows a simplified functional block diagram of the receiving circuit 100 according to another embodiment of the present disclosure. As shown in FIG. 3, the receiving circuit 100 may further comprise an additional amplifier 320 to amplify the external oscillating signal ES generated by the external oscillator 104, so as to increase the accuracy of the I/Q mismatch calibration conducted by the calibration circuit 190.

For example, the amplifier 320 may be positioned between the first switch element 142 and the band-pass filter 130, as shown in FIG. 3.

Figure 4:
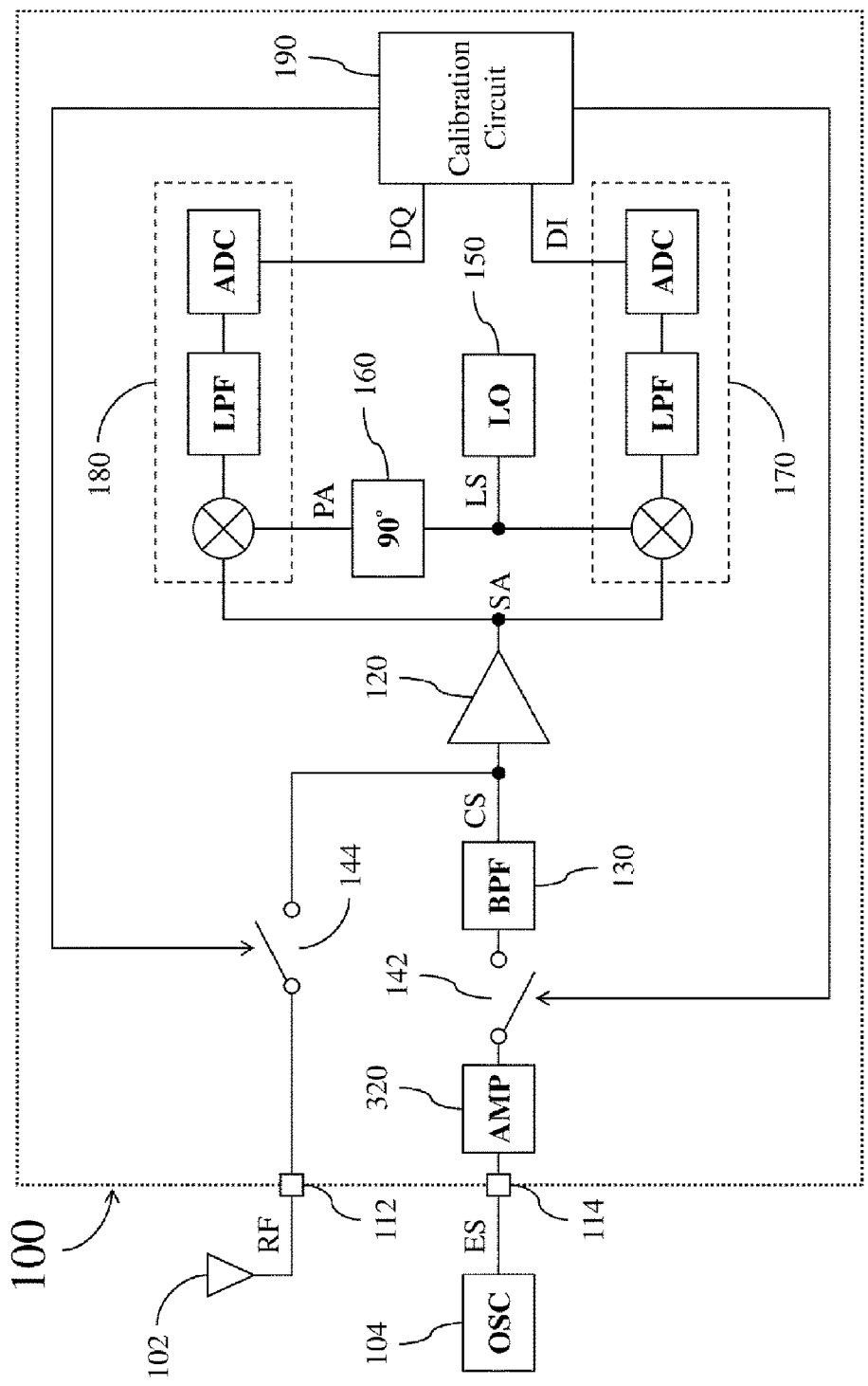
FIG. 4 shows a simplified functional block diagram of a receiving circuit according to a fourth embodiment of the present disclosure.

Alternatively, the amplifier 320 may be positioned between the second receiving terminal 114 and the first switch element 142, as shown in FIG. 4.

Figure 5:
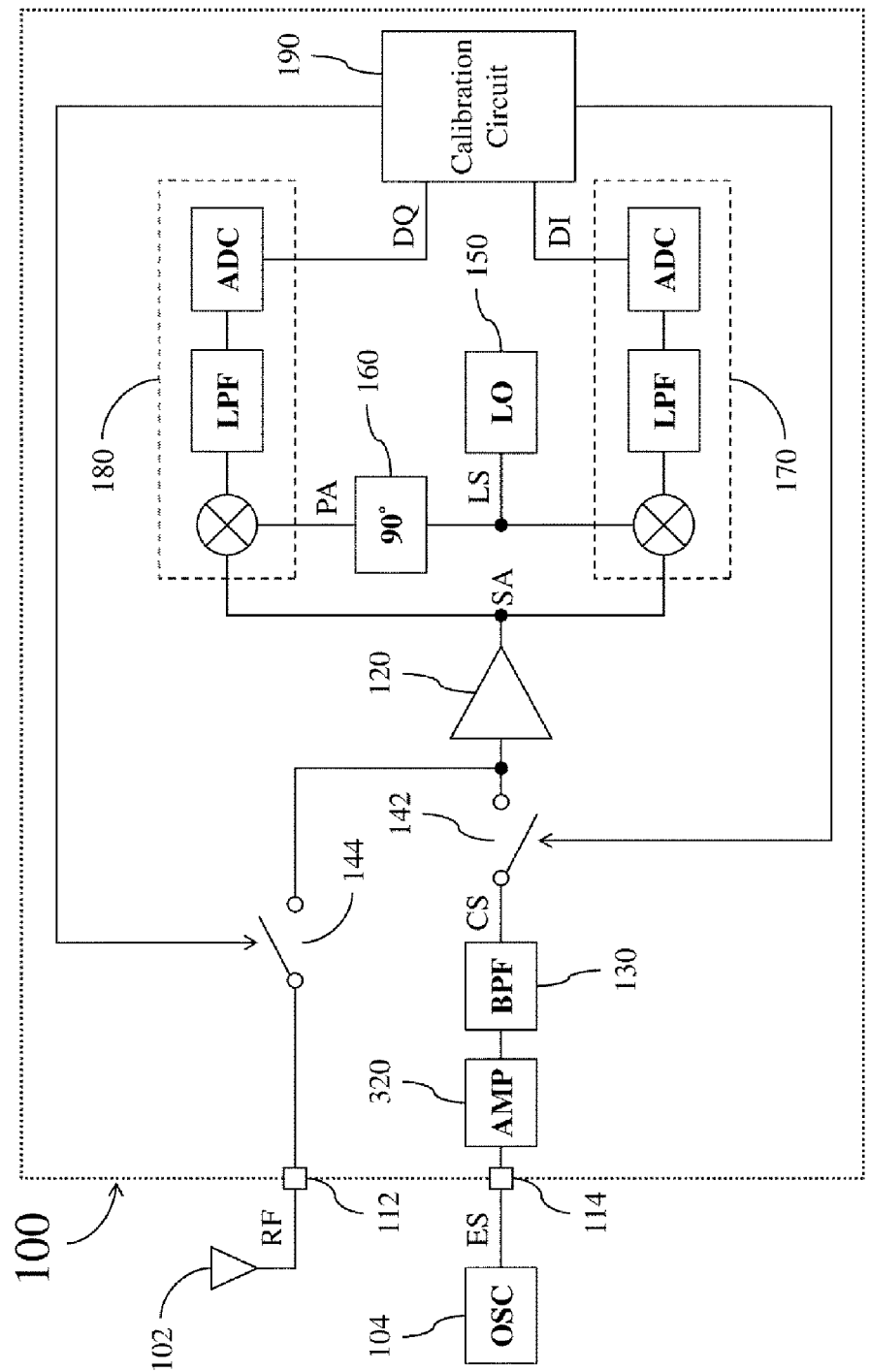
FIG. 5 shows a simplified functional block diagram of a receiving circuit according to a fifth embodiment of the present disclosure.

Alternatively, the amplifier 320 may be positioned between the second receiving terminal 114 and the band-pass filter 130, as shown in FIG. 5.

The foregoing descriptions regarding the connections, implementations, operations, and related advantages of other corresponding functional blocks in FIG. 1 are also applicable to the embodiments of FIGS. 2~5. For the sake of brevity, those descriptions will not be repeated here.

Please note that the structure of the aforementioned receiving circuit 100 is merely an embodiment, rather than a restriction to the practical implementations. For example, in some applications, such as the aforementioned GPS receivers and BDS receives, the signal strength of the radio frequency signal RF is typically much lower than the signal strength of the external oscillating signal ES. Therefore, even if the radio frequency signal RF and the external oscillating signal ES are simultaneously coupled to the input terminal of the low-noise amplifier 120, the I/Q mismatch calibration performed by the calibration circuit 190 would not be significantly affected. In this situation, the second switch element 144 of the receiving circuit 100 may be omitted, so that no switch element is positioned on the signal path between the first receiving terminal 112 and the low-noise amplifier 120. In this way, the circuit structure of the receiving circuit 100 can be simplified and the control complexity of the calibration circuit 190 can be reduced.

In addition, the band-pass filter 130 may also be omitted in some embodiments to simplify the circuit structure.

It can be appreciated from the foregoing descriptions that the receiving circuit 100 is enabled to perform the I/Q mismatch calibration based on the external oscillating signal ES generated by the external oscillator 104 when the first switch element 142 is turned off, without relying on any signal generated from associated transmitting circuit (not shown). Accordingly, there is no need to arrange additional signal transmission circuit between the receiving circuit 100 and the transmitting circuit, and thus the circuit structure and design complexity of the communication device can be reduced.

Since the external oscillator 104 may be realized with various existing oscillators employed in the communication system to which the receiving circuit 100 resides, there is no need to arrange an additional dedicated oscillating circuit for the receiving circuit 100.

Additionally, in some environments or periods of time where the external antenna 102 is not able to receive the radio frequency signal RF, the receiving circuit 100 can still perform the aforementioned I/Q mismatch calibration. Accordingly, the I/Q mismatch calibration conducted by the receiving circuit 100 is not restricted by the signal reception condition of the external antenna 102.

Furthermore, since the receiving circuit 100 is enabled to perform the I/Q mismatch calibration without relying on any signal generated by the transmitting signal, the disclosed receiving circuit 100 can be utilized in many communication devices that do not have the transmitting circuit, such as the GPS receivers or BDS receivers.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The tem "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A receiving circuit (100) for processing a radio frequency signal (RF) transmitted from an external antenna (102) and capable of performing an I/Q mismatch calibration based on an external oscillating signal (ES) generated by an external oscillator (104), the receiving circuit (100) comprising:
    a first receiving terminal (112) utilized for coupling with the external antenna (102) to receive the radio frequency signal (RF);
    a second receiving terminal (114) utilized for coupling with an output terminal of the external oscillator (104) to receive the external oscillating signal (ES);
    a low-noise amplifier (120), coupled with the first receiving terminal (112) and the second receiving terminal (114), arranged to operably generate an output signal (SA) based on an incoming signal;
    a band-pass filter (130), positioned on the signal path between the second receiving terminal (114) and the low-noise amplifier (120), arranged to operably generate a calibration signal (CS) according to the external oscillating signal (ES);
    a first switch element (142) positioned on a signal path between the second receiving terminal (114) and the low-noise amplifier (120);
    an in-phase signal processing circuit (170), coupled with an output terminal of the low-noise amplifier (120), arranged to operably generate an in-phase detection signal (DI) based on the output signal (SA);
    a quadrature signal processing circuit (180), coupled with the output terminal of the low-noise amplifier (120), arranged to operably generate a quadrature detection signal (DQ) based on the output signal (SA); and
    a calibration circuit (190), coupled with the first switch element (142), the in-phase signal processing circuit (170), and the quadrature signal processing circuit (180), arranged to operably control the first switch element (142) and capable of performing the I/Q mismatch calibration according to the in-phase detection signal (DI) and the quadrature detection signal (DQ) when the first switch element (142) is turned on.

2. The receiving circuit (100) of claim 1, further comprising:
    a local oscillator (150), coupled with the in-phase signal processing circuit (170), arranged to operably generate and output a local oscillating signal (LS) to the in-phase signal processing circuit (170); and
    a phase adjusting circuit (160), coupled with the local oscillator (150) and the quadrature signal processing circuit (180), arranged to operably generate a phase-adjusted signal (PA) having a predetermined phase difference with the local oscillating signal (LS) and to operably output the phase-adjusted signal (PA) to the quadrature signal processing circuit (180).

3. The receiving circuit (100) of claim 1, wherein the first switch element (142) is positioned on a signal path between the second receiving terminal (114) and the band-pass filter (130).

4. The receiving circuit (100) of claim 3, further comprising:
    an amplifier (320), positioned between the first switch element (142) and the band-pass filter (130), arranged to operably amplify the external oscillating signal (ES).

5. The receiving circuit (100) of claim 3, further comprising:
    an amplifier (320), positioned between the second receiving terminal (114) and the first switch element (142), arranged to operably amplify the external oscillating signal (ES).

6. The receiving circuit (100) of claim 1, wherein the first switch element (142) is positioned on a signal path between the band-pass filter (130) and the low-noise amplifier (120).

7. The receiving circuit (100) of claim 6, further comprising:
   an amplifier (320), positioned between the second receiving terminal (114) and the band-pass filter (130), arranged to operably amplify the external oscillating signal (ES).

8. The receiving circuit (100) of claim 1, wherein the band-pass filter (130) is arranged to operably output an Nth harmonic signal of the external oscillating signal (ES) to be the calibration signal (CS).

9. The receiving circuit (100) of claim 1, further comprising:
   a second switch element (144) positioned on a signal path between the first receiving terminal (112) and the low-noise amplifier (120), and controlled by the calibration circuit (190);
   wherein the calibration circuit (190) is arranged to operably turn off the second switch element (144) while turns on the first switch element (142).

10. The receiving circuit (100) of claim 1, wherein no switch element is positioned on a signal path between the first receiving terminal (112) and the low-noise amplifier (120).

\* \* \* \* \*